US012198654B2

(12) United States Patent
Higuchi

(10) Patent No.: US 12,198,654 B2
(45) Date of Patent: Jan. 14, 2025

(54) OUTPUT AMPLIFIER, SOURCE DRIVER, AND DISPLAY APPARATUS

(71) Applicant: LAPIS Technology Co., Ltd., Yokohama (JP)

(72) Inventor: Koji Higuchi, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/609,852

(22) Filed: Mar. 19, 2024

(65) Prior Publication Data

US 2024/0321233 A1 Sep. 26, 2024

(30) Foreign Application Priority Data

Mar. 23, 2023 (JP) ................................ 2023-046603

(51) Int. Cl.
*G09G 3/36* (2006.01)
*G09G 3/3258* (2016.01)

(52) U.S. Cl.
CPC ......... *G09G 3/3696* (2013.01); *G09G 3/3258* (2013.01); *G09G 2310/0291* (2013.01)

(58) Field of Classification Search
CPC ......... G09G 2310/0291; G09G 3/3258; G09G 3/3696
See application file for complete search history.

(56) References Cited

U.S. PATENT DOCUMENTS 9,093,964 B2 * 7/2015 Kawagoshi ......... H03F 3/45076
2006/0017504 A1 * 1/2006 Deval ................. H03F 3/45183 330/253
2010/0231569 A1 * 9/2010 Shimatani ............ G09G 3/3688 345/211
2011/0141092 A1 * 6/2011 Kawagoshi ......... H03F 3/45076 330/253
2015/0317943 A1 * 11/2015 Kawagoshi ......... H03F 3/45076 345/92
2018/0144707 A1 * 5/2018 Tsuchi .................. H03F 3/4521
2019/0012980 A1 * 1/2019 Shiibayashi ......... G09G 3/3696
2024/0321233 A1 * 9/2024 Higuchi ............... G09G 3/3696

FOREIGN PATENT DOCUMENTS

JP 2012027127 A 2/2012

* cited by examiner

*Primary Examiner* — Dmitriy Bolotin
(74) *Attorney, Agent, or Firm* — VOLENTINE, WHITT & FRANCOS, PLLC

(57) ABSTRACT

An output amplifier which includes a drive voltage generating unit that generates a positive drive voltage and a negative drive voltage corresponding to a difference between an input voltage and an output voltage, an output unit including a first transistor and a second transistor forming a complementary output between a positive power supply terminal and a negative power supply terminal, the first transistor flowing out the current from the positive power supply terminal to the output terminal corresponding to the positive drive voltage, and the second transistor flowing the current from the output terminal into the negative power supply terminal corresponding to the negative drive voltage, and clamp voltage generating circuits that apply a positive clamp voltage corresponding to the input voltage to the positive power supply terminal and apply a negative clamp voltage corresponding to the input voltage to the negative power supply terminal.

8 Claims, 9 Drawing Sheets

OUTPUT AMPLIFIER, SOURCE DRIVER, AND DISPLAY APPARATUS

CROSS-REFERENCE TO RELATED APPLICATION

This application is based upon and claims the benefit of priority from the prior Japanese Patent Application No. 2023-046603 filed on Mar. 23, 2023, the entire contents of which are incorporated herein by reference.

BACKGROUND

1. Technical Field

The disclosure relates to an output amplifier, a source driver including the output amplifier, and a display apparatus including the source driver.

2. Description of the Related Art

In recent display apparatuses, a driving time per pixel is becoming shorter in accordance with increase of definition and speed of display panels. Therefore, a slew rate of an output amplifier has gradually increased. For example, Japanese Patent Kokai No. 2012-27127 discloses a source driver of a liquid crystal display apparatus in which a slew rate is attempted to increase while increase of power consumption is suppressed.

The source driver of Japanese Patent Kokai No. 2012-27127 includes a plurality of output amplifiers that drives a plurality of data lines of a display panel in response to an input signal, and a bias control circuit including a dummy amplifier having consistency with an electric characteristic of the output amplifiers. The bias control circuit controls high bias periods of the plurality of output amplifiers based on an output transition period of the dummy amplifier when the dummy amplifier receives voltages of a y-resistor circuit input, which are input to the output amplifiers.

Incidentally, while a reaction speed of liquid crystal is low in a liquid crystal display apparatus, a response speed is high in an organic electroluminescence display (OELD) of an organic EL display apparatus. Therefore, a gradation shifts in response to instantaneous overshoot and undershoot of a drive waveform of the OELD panel in some cases. To deal with this, for the source driver that drives the OELD panel of the organic EL display apparatus, an output amplifier not causing a ringing is desired.

Therefore, it is an object of the disclosure to provide an output amplifier, a source driver, and a display apparatus capable of suppressing a ringing while a high slew rate is maintained.

SUMMARY

An output amplifier according to the disclosure amplifies an input voltage to generate an output voltage and outputs the output voltage from an output terminal, the output amplifier comprising: a drive voltage generating unit that generates a positive drive voltage and a negative drive voltage corresponding to a difference between the input voltage and the output voltage; an output unit including a first transistor for flowing out of a current and a second transistor for flowing in of the current forming a complementary output between a first positive power supply terminal and a first negative power supply terminal, the first transistor flowing out the current from the first positive power supply terminal to the output terminal in accordance with the positive drive voltage, the second transistor flowing the current from the output terminal into the first negative power supply terminal in accordance with the negative drive voltage; a positive clamp voltage generating circuit that applies a positive clamp voltage corresponding to the input voltage to the first positive power supply terminal; and a negative clamp voltage generating circuit that applies a negative clamp voltage corresponding to the input voltage to the first negative power supply terminal.

A source driver according to the disclosure comprises: a gradation voltage signal generating unit that generates gradation voltage signals for a plurality of data lines of a display panel corresponding to a video signal; and a plurality of output amplifiers that amplify the gradation voltage signals to obtain respective drive signals and output the drive signals to the plurality of data lines of the display panel, wherein each of the plurality of output amplifiers includes: a drive voltage generating unit that generates a positive drive voltage and a negative drive voltage corresponding to a difference between a voltage of a corresponding gradation voltage signal of the gradation voltage signals and a voltage of a corresponding drive signal of the drive signals; an output unit including a first transistor for flowing out of a current and a second transistor for flowing in of the current forming a complementary output between a positive power supply terminal and a negative power supply terminal, the first transistor flowing out the current from the positive power supply terminal to a corresponding data line of the plurality of data lines in accordance with the positive drive voltage, the second transistor flowing the current from the corresponding data line to the negative power supply terminal in accordance with the negative drive voltage; a positive clamp voltage generating circuit that applies a positive clamp voltage corresponding to the voltage of the corresponding gradation voltage signal to the positive power supply terminal; and a negative clamp voltage generating circuit that applies a negative clamp voltage corresponding to the voltage of the corresponding gradation voltage signal to the negative power supply terminal.

A display apparatus according to the disclosure comprises: a display panel including a plurality of data lines and a plurality of gate lines, and display cells provided at respective intersecting portions of the plurality of data lines and the plurality of gate lines in a matrix; a gate driver that is connected to the plurality of gate lines, selects a gate line of the plurality of gate lines in a predetermined order, and supplies gate signals to the selected gate line; a source driver including a gradation voltage signal generating unit and a plurality of output amplifiers, the gradation voltage signal generating unit generating gradation voltage signals for the plurality of data lines corresponding to a video signal, the plurality of output amplifiers amplifying the gradation voltage signals to obtain respective drive signals and outputting the drive signals to the plurality of data lines of the display panel; and a display controller that controls respective operations of the gate driver and the source driver based on the video signal, wherein each of the plurality of output amplifiers includes: a drive voltage generating unit that generates a positive drive voltage and a negative drive voltage corresponding to a difference between a voltage of a corresponding gradation voltage signal of the gradation voltage signals and a voltage of a corresponding drive signal of the drive signals; an output unit including a first transistor for flowing out of a current and a second transistor for flowing in of the current forming a complementary output between a positive power supply terminal and a negative power supply terminal, the first transistor flowing out the current from the positive power supply terminal to a corresponding data line of the plurality of data lines in accordance with the positive drive voltage, the second transistor flowing the current from the corresponding data line to the negative power supply terminal in accordance with the negative drive voltage; a positive clamp voltage generating circuit that applies a positive clamp voltage corresponding to the voltage of the corresponding gradation voltage signal to the positive power supply terminal; and a negative clamp voltage generating circuit that applies a negative clamp voltage corresponding to the voltage of the corresponding gradation voltage signal to the negative power supply terminal.

DETAILED DESCRIPTION

According to the output amplifier, the source driver, and the display apparatus of the disclosure, the positive clamp voltage and the negative clamp voltage corresponding to the input voltage of the output amplifier are applied to the first and the second transistors. Therefore, since the room for overshooting and undershooting of the output voltage of the output amplifier is eliminated, the ringing can be suppressed while the high slew rate is maintained.

The following describes embodiments of the disclosure with reference to the drawings in detail.

Figure 1:
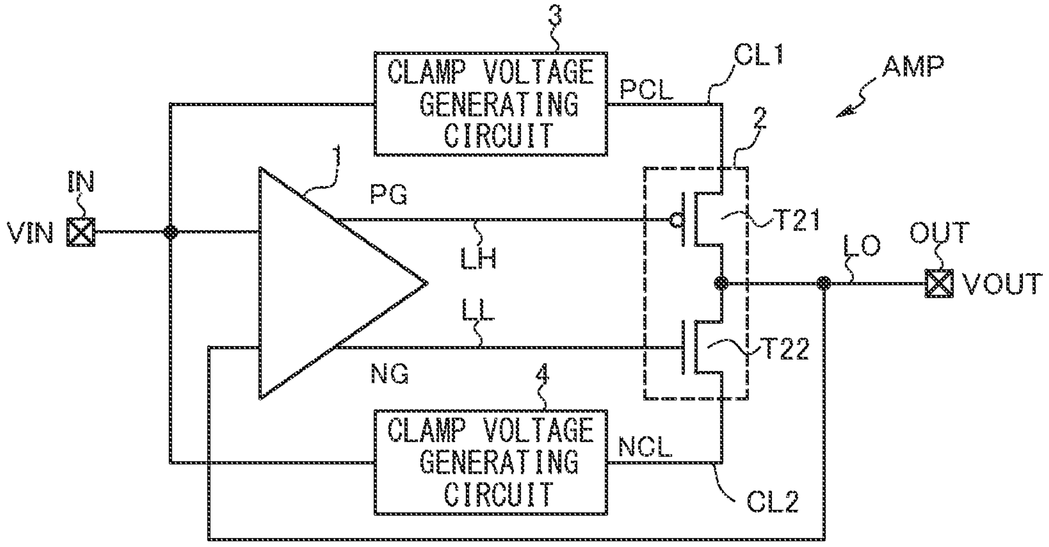
FIG. 1 is a circuit diagram illustrating an internal configuration of an output amplifier of Embodiment 1 of the disclosure.

FIG. 1 illustrates a schematic configuration of an output amplifier of Embodiment 1 of the disclosure. In FIG. 1 the output amplifier is indicated by a reference sign AMP, and includes a drive voltage generating unit 1, an output unit 2, and clamp voltage generating circuits 3, 4. The output amplifier AMP forms a voltage follower.

The drive voltage generating unit 1 generates a positive drive voltage PG corresponding to a difference between an input voltage VIN supplied to an input terminal IN and a voltage VOUT of an output line LO of the output unit 2, and supplies the positive drive voltage PG to the output unit 2 via a positive drive line LH. Further, the drive voltage generating unit 1 generates a negative drive voltage NG corresponding to a difference between the input voltage VIN and the voltage VOUT of the output line LO, and supplies the negative drive voltage NG to the output unit 2 via a negative drive line LL. That is, the positive drive voltage PG and the negative drive voltage NG are generated such that the voltage VOUT becomes equal to the input voltage VIN.

The output unit 2 includes a transistor T21 of a P-channel MOS (metal oxide semiconductor) type and a transistor T22 of an N-channel MOS type. The transistor T21 and the transistor T22 form a complementary output (totem-pole output). The transistor T21 is for flowing out of a current, and the transistor T22 is for flowing in of the current.

The transistor T21 has a source connected to an output line CL1 (first positive power supply terminal) of the clamp voltage generating circuit 3, and a gate connected to the positive drive line LH. The transistor T21 has a drain connected to the output line LO and a drain of the transistor T22. The transistor T22 has a source connected to an output line CL2 (first negative power supply terminal) of the clamp voltage generating circuit 4, and a gate connected to the negative drive line LL. The output line LO is connected to the drive voltage generating unit 1, and connected to an output terminal OUT. The voltage VOUT of the output line LO is an output drive voltage.

The clamp voltage generating circuits 3, 4 are connected to the input terminal IN, and generate clamp voltages PCL, NCL corresponding to a level of the input voltage VIN supplied to the input terminal IN. A positive clamp voltage PCL generated by the clamp voltage generating circuit 3 is VIN+$\alpha$, and a negative clamp voltage NCL generated by the clamp voltage generating circuit 4 is VIN−$\alpha$. $\alpha$ is a predetermined voltage set to avoid occurrence of ringing, that is, overshooting and undershooting. A relation of VDD≥PCL, VSS≤NCL is satisfied between the clamp voltages PCL, NCL and a power supply voltage VDD and a ground potential VSS of the output amplifier AMP.

The clamp voltage PCL is supplied to the source of the transistor T21 via the output line CL1. The clamp voltage NCL is supplied to the source of the transistor T22 via the output line CL2.

Figure 2:
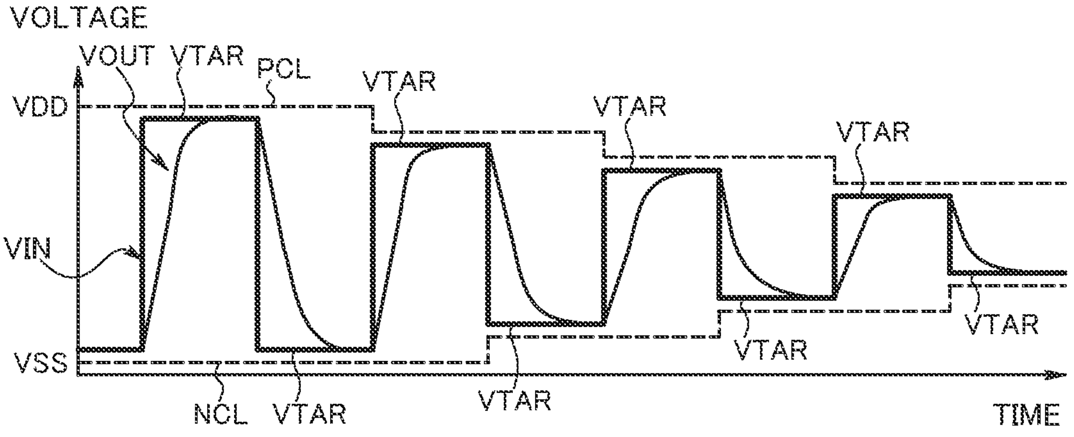
FIG. 2 is a timing chart illustrating an operation of the output amplifier of FIG. 1.

In the output amplifier AMP having the configuration as described above according to the disclosure, assume that the input voltage VIN supplied to the input terminal IN varies as a rectangular wave with a predetermined cycle as illustrated in FIG. 2. At a rising of the input voltage VIN, since the input voltage VIN immediately reaches a target voltage VTAR and a positive driving period starts, the clamp voltage PCL is the target voltage VTAR+$\alpha$. That is, in the positive driving period, the clamp voltage PCL decreases as the target voltage VTAR of the input voltage VIN decreases. Meanwhile, at a falling of the input voltage VIN, since the input voltage VIN immediately reaches the target voltage VTAR and a negative driving period starts, the clamp voltage NCL is the target voltage VTAR−$\alpha$. That is, in the negative driving period, the clamp voltage NCL increases as the target voltage VTAR of the input voltage VIN increases.

The clamp voltages PCL, NCL reduce voltage differences between the target voltage VTAR and actual source voltages of the transistors T21, T22, thus eliminating the room for overshooting and undershooting of the drain voltages of the transistors T21, T22 as outputs. Accordingly, when the voltage VOUT of the output line LO reaches the target voltage VTAR, as illustrated in FIG. 2, the target voltage VTAR is maintained without overshooting or undershooting. Even when the magnitude of the target voltage VTAR of the input voltage VIN changes, the occurrence of ringing, such as overshooting and undershooting, can be suppressed.

Figure 3:
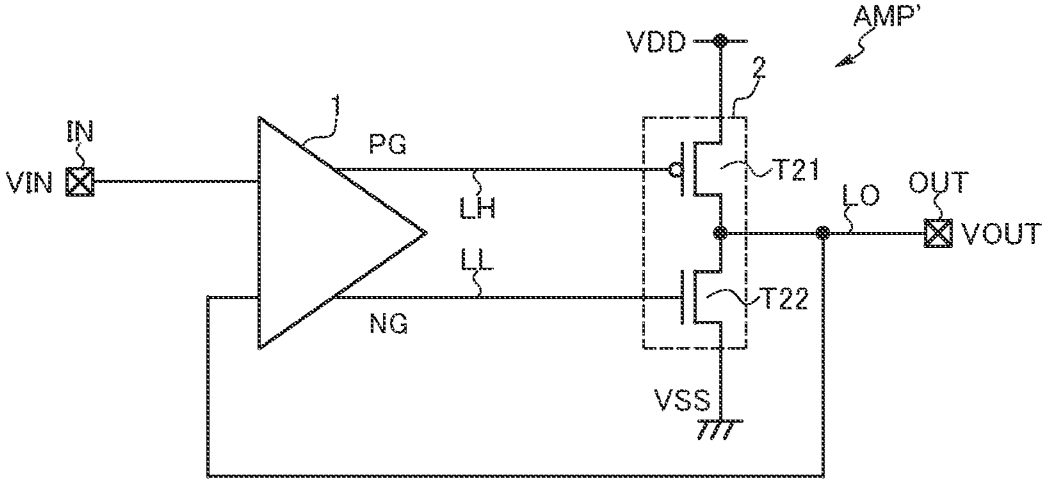
FIG. 3 is a circuit diagram illustrating an internal configuration of an output amplifier for a comparison of an operation with the output amplifier of FIG. 1.

FIG. 3 illustrates a schematic configuration of an output amplifier AMP' not using the clamp voltage generating circuits 3, 4 of FIG. 1 for a comparison with the operation of the output amplifier AMP according to the disclosure illustrated in FIG. 1. In FIG. 3, the power supply voltage VDD is applied to the source of the transistor T21 of the output unit 2, and the ground potential VSS is applied to the source of the transistor T22. Other configurations are same as those of the output amplifier AMP of FIG. 1.

Figure 4:
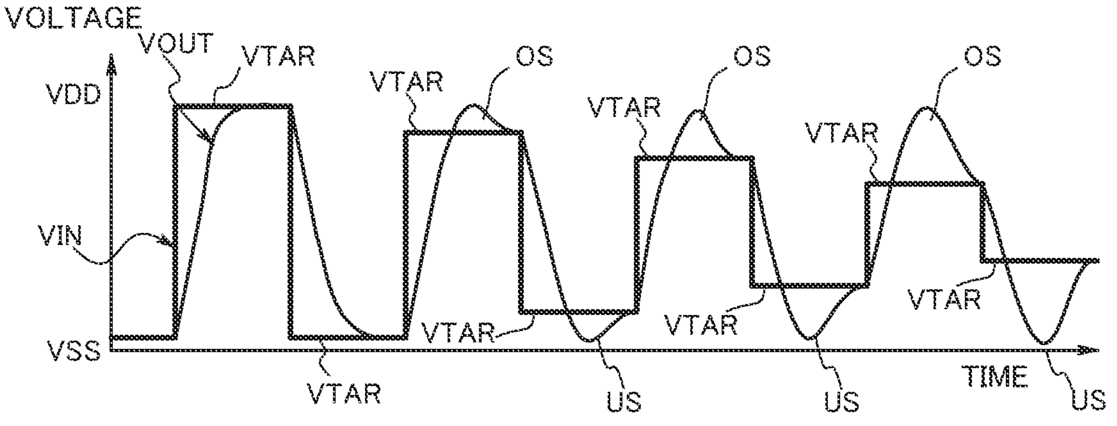
FIG. 4 is a timing chart illustrating the operation of the output amplifier of FIG. 3.

In the output amplifier AMP' illustrated in FIG. 3, as illustrated in FIG. 4, the voltage difference between the target voltage VTAR and the actual source voltages of the transistors T21, T22 increases as the magnitude of the target voltage VTAR decreases. Accordingly, when the voltage VOUT of the output line LO reaches the target voltage VTAR, as illustrated in FIG. 4, an overshooting OS or an undershooting US exceeding the target voltage VTAR occurs. The smaller the magnitude of the target voltage VTAR of the input voltage VIN becomes, the larger overshooting OS and undershooting US occur.

In contrast, in the output amplifier AMP of FIG. 1, which is Embodiment 1 of the disclosure, even when the magnitude of the target voltage VTAR of the input voltage VIN decreases, the clamp voltages PCL, NCL decrease following the target voltage VTAR. Therefore, as illustrated in FIG. 2, when the voltage VOUT of the output line LO reaches the target voltage VTAR, the occurrence of the overshooting or the undershooting from the target voltage VTAR is suppressed and the target voltage VTAR is maintained. In contrast, the clamp voltages PCL, NCL increase following the target voltage VTAR as the magnitude of the target voltage VTAR of the input voltage VIN increases.

Accordingly, since the voltage VOUT can quickly reach the target voltage VTAR and the target voltage VTAR can be maintained in accordance with the rise or the fall of the input voltage VIN to the target voltage VTAR, the ringing can be suppressed while a high slew rate is maintained.

Figure 5:
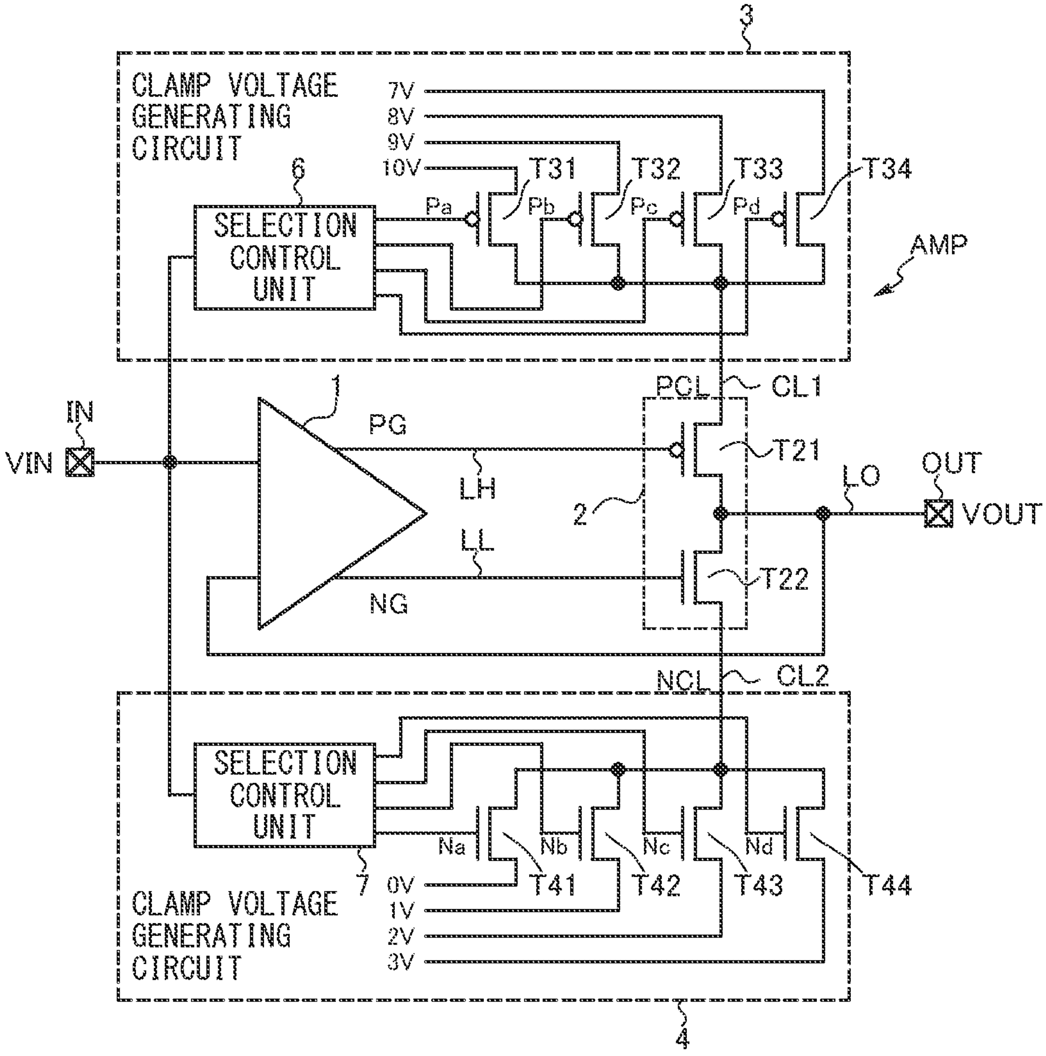
FIG. 5 is a circuit diagram illustrating a configuration of a specific example of a clamp voltage generating circuit in the output amplifier of FIG. 1.

FIG. 5 illustrates a specific example of the clamp voltage generating circuits 3, 4 of FIG. 1. The clamp voltage generating circuit 3 includes P-channel MOS type transistors T31, T32, T33, and T34 and a selection control unit 6. The clamp voltage generating circuit 4 includes N-channel MOS type transistors T41, T42, T43, and T44 and a selection control unit 7.

A voltage of 10 V is applied to a source of the transistor T31, a voltage of 9 V is applied to a source of the transistor T32, a voltage of 8 V is applied to a source of the transistor T33, and a voltage of 7 V is applied to a source of the transistor T34. Drains of the transistors T31, T32, T33, and T34 are connected to the source of the transistor T21 in common. Gates of the transistors T31, T32, T33, and T34 are connected to the selection control unit 6. The selection control unit 6 is connected to the input terminal IN, receives the input voltage VIN, and generates selection signals Pa, Pb, Pc, and Pd corresponding to a logic 0 or 1 based on a level of the input voltage VIN. The selection signal Pa is supplied to the gate of the transistor T31, the selection signal Pb is supplied to the gate of the transistor T32, the selection signal Pc is supplied to the gate of the transistor T33, and the selection signal Pd is supplied to the gate of the transistor T34.

Similarly, a voltage of 0 V is applied to a source of the transistor T41, a voltage of 1 V is applied to a source of the transistor T42, a voltage of 2 V is applied to a source of the transistor T43, and a voltage of 3 V is applied to a source of the transistor T44. Drains of the transistors T41, T42, T43, and T44 are connected to the source of the transistor T22 in common. Gates of the transistors T41, T42, T43, and T44 are connected to the selection control unit 7. The selection control unit 7 is connected to the input terminal IN, receives the input voltage VIN, and generates selection signals Na, Nb, Nc, and Nd corresponding to a logic 1 or a logic 0 based on a level of the input voltage VIN. The selection signal Na is supplied to the gate of the transistor T41, the selection signal Nb is supplied to the gate of the transistor T42, the selection signal Nc is supplied to the gate of the transistor T43, and the selection signal Nd is supplied to the gate of the transistor T44.

In the output amplifier AMP including the clamp voltage generating circuits 3, 4 configured as illustrated in FIG. 5 of the disclosure, the selection control unit 6 of the clamp voltage generating circuit 3 generates the selection signal Pa at a level indicating the logic 0 and generates the selection signals Pb, Pc, Pd at a level indicating the logic 1 in an initial state. The transistor T31 turns on in accordance with the selection signal Pa of the logic 0, and the transistors T32, T33, T34 turn off in accordance with the selection signals Pb to Pd of the logic 1. The voltage of 10 V is applied to the source of the transistor T21. Meanwhile, the selection control unit 7 of the clamp voltage generating circuit 4 generates the selection signal Na at a level indicating the logic 1 and generates the selection signals Nb to Nd at a level indicating the logic 0 in an initial state. The transistor T41 turns on in accordance with the selection signal Na of the logic 1, and the transistors T42, T43, T44 turn off in accordance with the selection signals Nb, Nc, Nd of the logic 0. The voltage of 0 V is applied to the source of the transistor T22.

Figure 6:
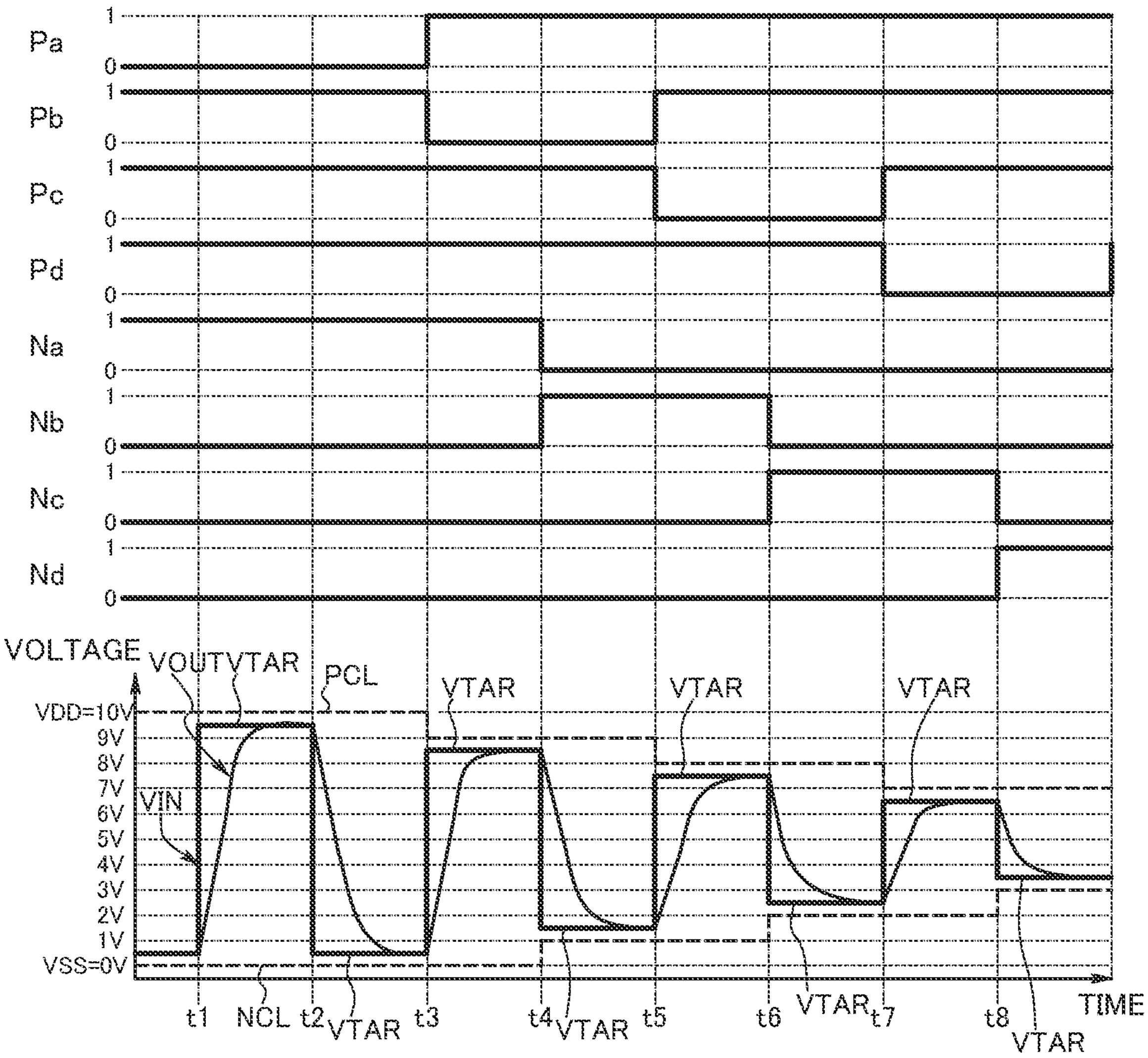
FIG. 6 is a timing chart illustrating an operation of the output amplifier including the clamp voltage generating circuit of FIG. 5.

Assume that the input voltage VIN supplied to the input terminal IN varies as a rectangular wave with a predetermined cycle as illustrated in FIG. 6. The selection control unit 6 generates the selection signals Pa, Pb, Pc, Pd corresponding to an achieved voltage at the rising of the input voltage VIN, and the selection control unit 7 generates the selection signals Na, Nb, Nc, Nd corresponding to the achieved voltage at the falling of the input voltage VIN.

The input voltage VIN rises at a time point t1, and when the input voltage VIN reaches 9.5 V as the target voltage VTAR at the rising, the selection control unit 6 generates the selection signal Pa at the level indicating the logic 0, and generates the selection signals Pb, Pc, Pd at the level indicating the logic 1. Similarly to the initial state, since the transistor T31 turns on, and the transistors T32, T33, T34 turn off, the voltage of 10 V supplied via the transistor T31 becomes the clamp voltage PCL. That is, the clamp voltage PCL is a voltage of 10 V higher than the input voltage VIN of 9.5 V by 0.5 V.

The input voltage VIN falls at a time point t2, and when the input voltage VIN reaches 0.5 V as the target voltage VTAR at the falling, the selection control unit 6 generates the selection signal Na at the level indicating the logic 1, and generates the selection signals Nb, Nc, Nd at the level indicating the logic 0. Similarly to the initial state, since the transistor T41 turns on, and the transistors T42, T43, T44 turn off, the voltage of 0 V supplied via the transistor T41 becomes the clamp voltage NCL. That is, the clamp voltage NCL is a voltage of 0 V lower than the input voltage VIN of 0.5 V by 0.5 V.

Next, the input voltage VIN rises at a time point t3, and when the input voltage VIN reaches 8.5 V at the rising, the selection control unit 6 generates the selection signal Pb at the level indicating the logic 0, and generates the selection signals Pa, Pc, Pd at the level indicating the logic 1. Since the transistor T32 turns on, and the transistors T31, T33, T34 turn off, the voltage of 9 V supplied via the transistor T32 becomes the clamp voltage PCL. That is, the clamp voltage PCL is a voltage of 9 V higher than the input voltage VIN of 8.5 V by 0.5 V.

The input voltage VIN falls at a time point t4, and when the input voltage VIN reaches 1.5 V at the falling, the selection control unit 6 generates the selection signal Nb at the level indicating the logic 1, and generates the selection signals Na, Nc, Nd at the level indicating the logic 0. Since the transistor T42 turns on, and the transistors T41, T43, T44 turn off, the voltage of 1 V supplied via the transistor T42 becomes the clamp voltage NCL. That is, the clamp voltage NCL is a voltage of 1 V lower than the input voltage VIN of 1.5 V by 0.5 V.

Subsequently, similarly, the input voltage VIN rises to 7.5 V as the target voltage VTAR at a time point t5, and the voltage of 8 V supplied via the transistor T33 to be turned on becomes the clamp voltage PCL. That is, the clamp voltage PCL is a voltage of 8 V higher than the input voltage VIN of 7.5 V by 0.5 V. The input voltage VIN falls to 2.5 V at a time point t6, and the voltage of 2 V supplied via the transistor T43 to be turned on becomes the clamp voltage NCL. That is, the clamp voltage NCL is a voltage of 2 V lower than the input voltage VIN of 2.5 V by 0.5 V. The input voltage VIN rises to 6.5 V at a time point t7, and the voltage of 7 V supplied via the transistor T34 to be turned on becomes the clamp voltage PCL. That is, the clamp voltage PCL is a voltage of 7 V higher than the input voltage VIN of 6.5 V by 0.5 V. The input voltage VIN falls to 3.5 V at a time point t8, and the voltage of 3 V supplied via the transistor T44 to be turned on becomes the clamp voltage NCL. That is, the clamp voltage NCL is a voltage of 3 V lower than the input voltage VIN of 3.5 V by 0.5 V.

Figure 7:
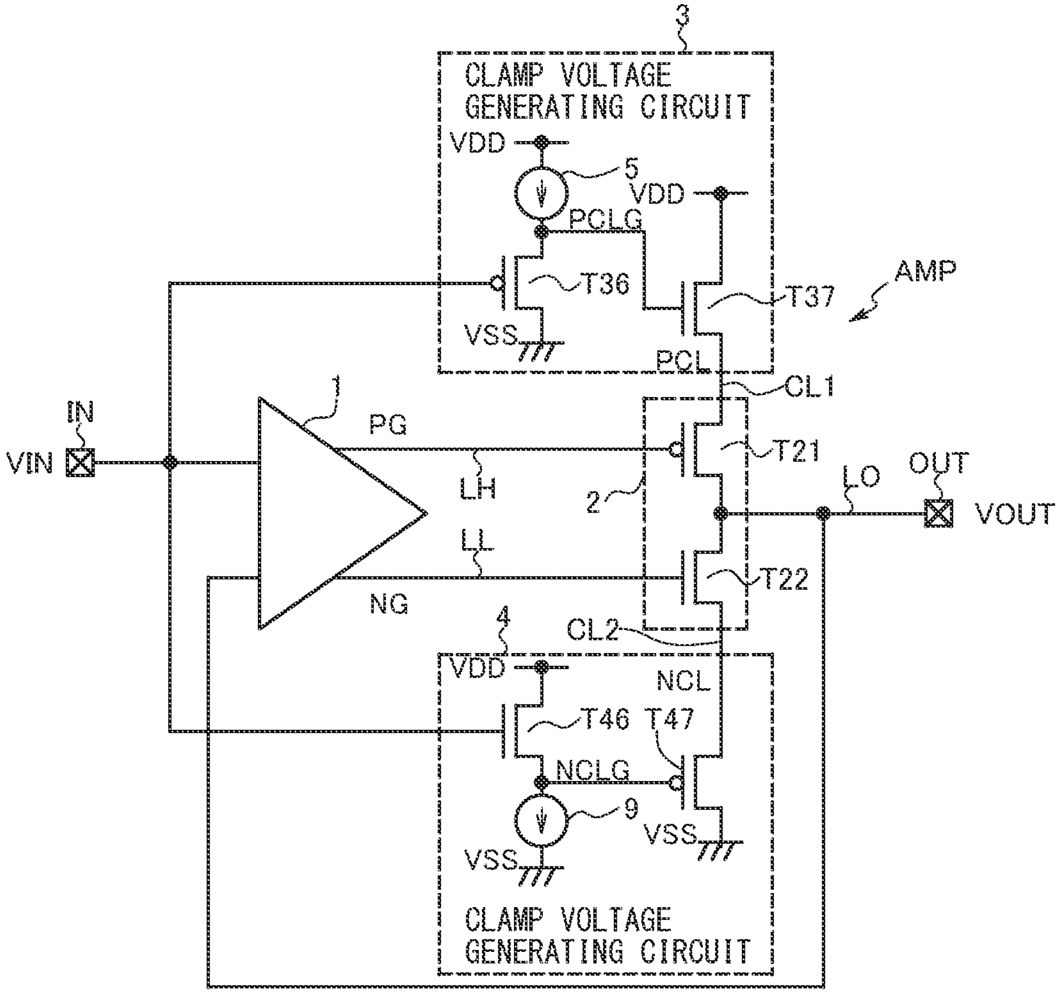
FIG. 7 is a circuit diagram illustrating a configuration of another specific example of the clamp voltage generating circuit in the output amplifier of FIG. 1.

FIG. 7 illustrates another specific example of the clamp voltage generating circuits 3, 4 of FIG. 1. The clamp voltage generating circuit 3 includes a P-channel MOS type transistor T36, an N-channel MOS type transistor T37, and a current source 5. The clamp voltage generating circuit 4 includes an N-channel MOS type transistor T46, a P-channel MOS type transistor T47, and a current source 9.

In the clamp voltage generating circuit 3 of FIG. 7, the input voltage VIN is applied to a gate of the transistor T36. A power supply voltage VDD is applied to a source of the transistor T36 via the current source 5, and a drain of the transistor T36 is connected to ground. Thus, a P-channel source follower circuit is formed. The source of the transistor T36 is connected to a gate of the transistor T37. The power supply voltage VDD is applied to a drain of the transistor T37, and a source of the transistor T37 is connected to the source of the transistor T21. A source voltage of the transistor T37 becomes the clamp voltage PCL.

In the clamp voltage generating circuit 4 of FIG. 7, the input voltage VIN is applied to a gate of the transistor T46. A power supply voltage VDD is applied to a drain of the transistor T46. A source of the transistor T46 is connected to a gate of the transistor T47, and connected to ground via the current source 9. Thus, an N-channel source follower circuit is formed. A source of the transistor T47 is connected to the source of the transistor T22. A drain of the transistor T47 is connected to ground. A source voltage of the transistor T47 becomes the clamp voltage NCL.

In the output amplifier AMP of the disclosure configured as illustrated in FIG. 7, when the input voltage VIN is supplied to the gate of the transistor T36 of the clamp voltage generating circuit 3, and thus the current flows between the source and the drain of the transistor T36, a source voltage PCLG of the transistor T36 becomes VIN+Vtp1. Vtp1 is a source-gate voltage of the transistor T36. The source voltage PCLG is applied to the gate of the transistor T37. The source voltage PCL of the transistor T37 becomes PCLG−Vtn1. Vtn1 is a source-gate voltage of the transistor T37. Here, since the clamp voltage PCL is VIN+$\alpha$, an amount of current and the like of the current source 5 are adjusted to meet PCLG−Vtn1=VIN+$\alpha$.

When the input voltage VIN is supplied to the gate of the transistor T46 of the clamp voltage generating circuit 4, and thus the current flows between the drain and the source of the transistor T46, a source voltage NCLG of the transistor T46 becomes VIN-Vtn2. Vtn2 is a source-gate voltage of the transistor T46. The source voltage NCLG is applied to the gate of the transistor T47. The source voltage NCL of the transistor T47 becomes NCLG+Vtp2. Vtp2 is a source-gate voltage of the transistor T47. Here, since the clamp voltage NCL is VIN−$\alpha$, an amount of current and the like of the current source 9 are adjusted to meet NCLG+Vtp2=VIN−$\alpha$.

Figure 8:
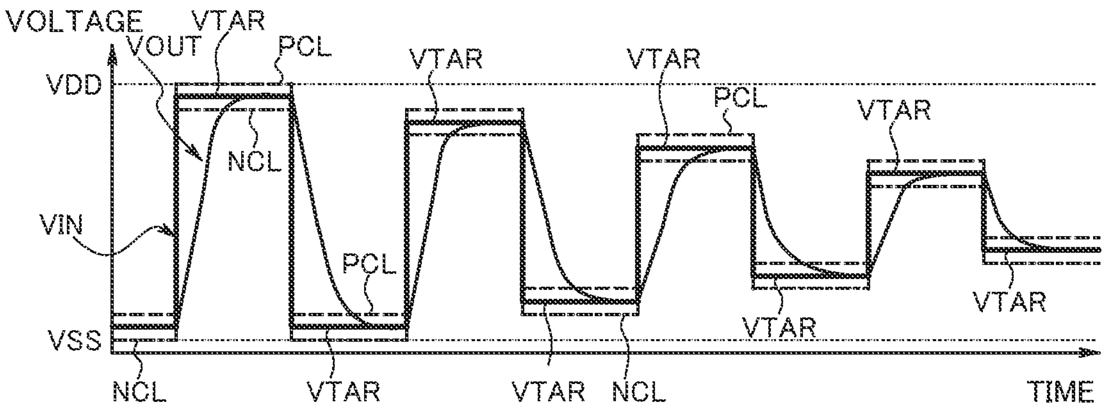
FIG. 8 is a timing chart illustrating an operation of the output amplifier including the clamp voltage generating circuit of FIG. 7.

Accordingly, as illustrated in FIG. 8, when the input voltage VIN reaches the target voltage VTAR at the rising of the input voltage VIN, the source voltage PCLG of the transistor T36 increases in accordance with the input voltage VIN, and applied to the gate of the transistor T37. The current flows between the drain and the source of the transistor T37, thereby causing the clamp voltage PCL=VIN+$\alpha$.

Next, when the input voltage VIN starts falling from the target voltage VTAR, the source voltage PCLG of the transistor T36 decreases in accordance with the input voltage VIN, and applied to the gate of the transistor T37. The current between the drain and the source of the transistor T37 decreases, thus reducing the clamp voltage PCL.

When the input voltage VIN reaches the target voltage VTAR due to the fall of the input voltage VIN, the source voltage NCLG of the transistor T46 decreases in accordance with the input voltage VIN, and applied to the gate of the transistor T47. The current flows between the drain and the source of the transistor T47, thereby causing the clamp voltage NCL=VIN−$\alpha$.

Next, when the input voltage VIN starts rising from the target voltage VTAR, the source voltage NCLG of the transistor T46 increases in accordance with the input voltage VIN, and applied to the gate of the transistor T47. The current between the drain and the source of the transistor T47 decreases, thus increasing the clamp voltage NCL.

The clamp voltages PCL, NCL that vary as described above reduce voltage differences between the target voltage VTAR and actual source voltages of the transistors T21, T22, thus eliminating the room for overshooting and undershooting of the drain voltages of the transistors T21, T22 as outputs.

Accordingly, when the voltage VOUT of the output line LO reaches the target voltage VTAR, as illustrated in FIG. 8, the target voltage VTAR is maintained without ringing, such as overshooting and undershooting. Even when the magnitude of the target voltage VTAR of the input voltage VIN changes, the occurrence of overshooting and undershooting can be suppressed.

Figure 9:
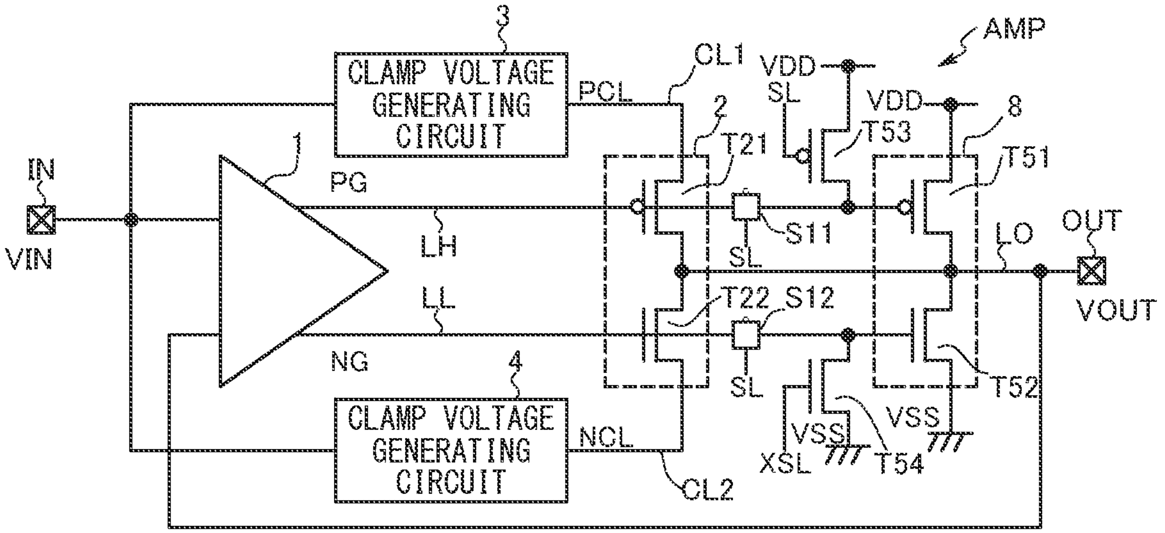
FIG. 9 is a circuit diagram illustrating an internal configuration of an output amplifier of Embodiment 2 of the disclosure.

FIG. 9 illustrates a configuration of an output amplifier AMP having a driving force switching function as Embodiment 2 of the disclosure. The output amplifier AMP includes an output unit 8 as an auxiliary output unit in addition to the output unit 2. The output unit 8 includes a P-channel MOS type transistor T51 and an N-channel MOS type transistor T52. The output amplifier AMP includes switch elements S11, S12 to switch operation states of the output units 2, 8, a P-channel MOS type transistor T53, and an N-channel MOS type transistor T54.

The transistor T51 has a source connected to a supply line (second positive power supply terminal) of a power supply voltage VDD, and a gate connected to a gate of a transistor T21 via the switch element S11. The transistor T52 has a source connected to a supply line (second negative power supply terminal) of a ground potential VSS, and a gate connected to a gate of a transistor T22 via the switch element S12. The transistors T51, T52 have drains mutually connected and connected to an output line LO. The switch elements S11, S12 are on/off switches.

The transistor T53 has a source connected to a supply line of the power supply voltage VDD, and a drain connected to the gate of the transistor T51. A switch signal SL is supplied to the gate of the transistor T53 and the switch element S11. When the switch signal SL exhibits the logic 1, the switch element S11 turns on, and the transistor T53 turns off. When the switch signal SL exhibits the logic 0, the switch element S11 turns off, and the transistor T53 turns on.

Similarly, the transistor T54 has a source connected to a supply line of the ground potential VSS, and a drain connected to the gate of the transistor T52. The switch signal SL is supplied to the switch element S12. When the switch signal SL exhibits the logic 1, the switch element S12 turns on, and when the switch signal SL exhibits the logic 0, the switch element S12 turns off. A switch signal XSL is supplied to a gate of the transistor T54. The switch signal XSL is an inverted signal of the switch signal SL. When the switch signal XSL exhibits the logic 0, the transistor T54 turns off. When the switch signal XSL exhibits the logic 1, the transistor T54 turns on.

Other configurations of the output amplifier AMP of Embodiment 2 are same as those of the output amplifier AMP of Embodiment 1 illustrated in FIG. 1. The switch signals SL, XSL are generated by a control unit (not illustrated) in accordance with the input voltage VIN.

Figure 10:
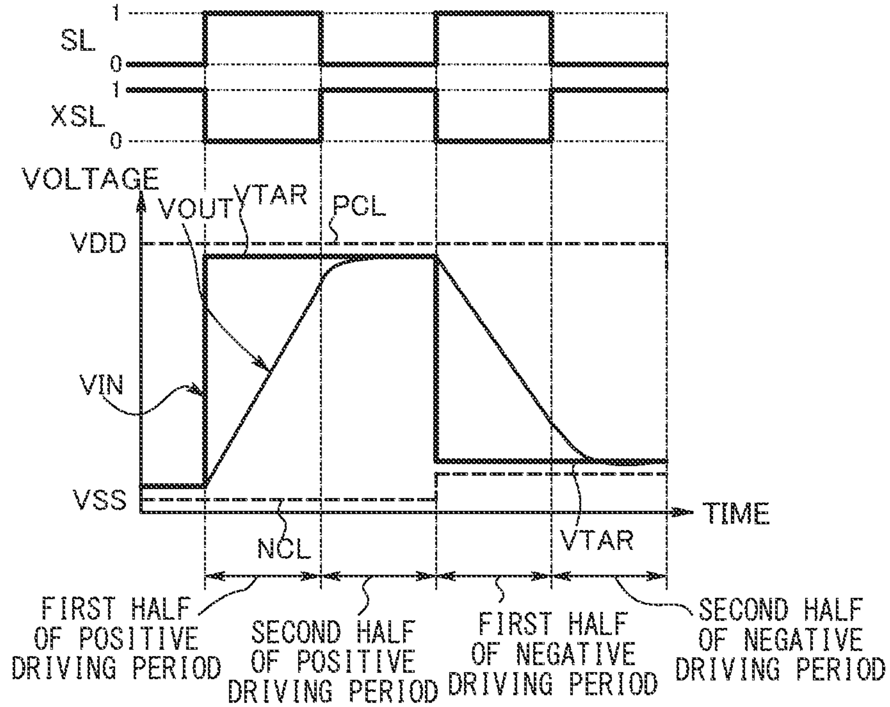
FIG. 10 is a timing chart illustrating an operation of the output amplifier of FIG. 9.

In the output amplifier AMP having the configuration as described above according to Embodiment 2, assume that the input voltage VIN supplied to the input terminal IN varies as a rectangular wave with a predetermined cycle as illustrated in FIG. 10. At a rising of the input voltage VIN, since the input voltage VIN immediately reaches a target voltage VTAR and a positive driving period starts, the clamp voltage PCL is the target voltage VTAR+α. That is, in the positive driving period, the clamp voltage PCL decreases as the target voltage VTAR of the input voltage VIN decreases. Meanwhile, at a falling of the input voltage VIN, since the input voltage VIN immediately reaches the target voltage VTAR and a negative driving period starts, the clamp voltage NCL is the target voltage VTAR−α. That is, in the negative driving period, the clamp voltage NCL increases as the target voltage VTAR of the input voltage VIN increases. This is the same as the output amplifier AMP of Embodiment 1.

In the first half of each of the positive driving period and the negative driving period, the switch signal SL exhibits the logic 1, and the switch signal XSL exhibits the logic 0. In the second half of each of the positive driving period and the negative driving period, the switch signal SL exhibits the logic 0, and the switch signal XSL exhibits the logic 1.

As illustrated in FIG. 10, in the first half of each of the positive driving period and the negative driving period, the switch elements S11, S12 turn on, and the transistors T53, T54 turn off. The positive drive voltage PG generated by the drive voltage generating unit 1 is supplied to the gate of the transistor T21 via the positive drive line LH, and further supplied to the gate of the transistor T51 via the switch element S11. Thus, the current flows between the source and the drain of each of the transistor T21 and the transistor T51. The negative drive voltage NG generated by the drive voltage generating unit 1 is supplied to the gate of the transistor T22 via the negative drive line LL, and further supplied to the gate of the transistor T52 via the switch element S12. Thus, the driving current flows between the drain and the source of each of the transistor T22 and the transistor T52. Accordingly, in the first half of each of the positive driving period and the negative driving period, the driving force increases, thus allowing quickly changing the output voltage VOUT toward the target voltage VTAR.

On the other hand, in the second half of each of the positive driving period and the negative driving period, the switch elements S11, S12 turn off, and the transistors T53, T54 turn on. The positive drive voltage PG generated by the drive voltage generating unit 1 is supplied to only the gate of the transistor T21 via the positive drive line LH, and not supplied to the gate of the transistor T51 because of the turning-off of the switch element S11. The gate voltage of the transistor T51 is kept at the power supply voltage VDD by the transistor T53. Thus, the driving current flows only between the source and the drain of the transistor T21. The negative drive voltage NG generated by the drive voltage generating unit 1 is supplied to only the gate of the transistor T22 via the negative drive line LL, and not supplied to the gate of the transistor T52 because of the turning-off of the switch element S12. The gate voltage of the transistor T52 is kept at the ground potential VSS by the transistor T54. Thus, the driving current flows only between the drain and the source of the transistor T22. Accordingly, in the second half of each of the positive driving period and the negative driving period, since the driving force is decreased compared with the first half, and the clamp voltages PCL, NCL are applied to the transistors T21, T22 similarly to Embodiment 1, the output voltage VOUT can be converged to the target voltage VTAR without causing the ringing.

In the configuration of the output amplifier AMP of Embodiment 1 illustrated in FIG. 1, by setting the clamp voltage PCL to be equal to the power supply voltage VDD in the first half of the positive driving period, adjusting the clamp voltage PCL to VIN+a in the second half of the positive driving period, setting the clamp voltage NCL to be equal to the ground potential VSS in the first half of the negative driving period, and adjusting the clamp voltage NCL to VIN-a in the second half of the negative driving period, the driving force may be set to be smaller in the second half than that in the first half in each of the positive driving period and the negative driving period.

While the driving force is increased in the first half of the positive driving period and the negative driving period in Embodiment 2, it is only necessary to have a configuration in which the driving force is increased in respective predetermined periods from the start of the positive driving period and the negative driving period.

Figure 11:
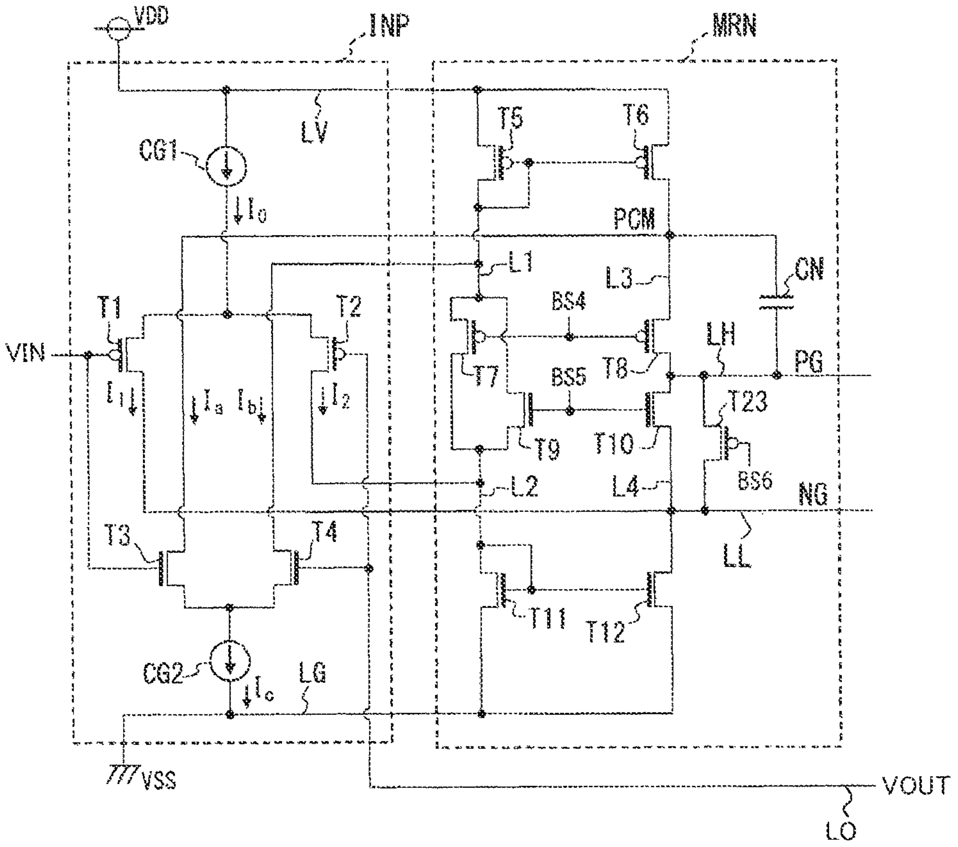
FIG. 11 is a circuit diagram illustrating an internal configuration of a drive voltage generating unit in the output amplifiers of FIG. 1 and FIG. 9.

The drive voltage generating units 1 in the output amplifiers AMP of Embodiments 1 and 2 described above can be configured, for example, as illustrated in FIG. 11. In FIG. 11, the drive voltage generating unit 1 includes a differential input unit INP and a current mirror unit MRN.

The differential input unit INP includes P-channel MOS type transistors T1, T2, N-channel MOS type transistors T3, T4, and current sources CG1 and CG2.

The current source CG1 receives supply of the power supply voltage VDD via the power supply line LV. The current source CG1 generates a predetermined constant current $I_0$ in response to the supply of the power supply voltage VDD, and divides the constant current $I_0$ to supply it to respective source terminals of the transistors T1 and T2.

The transistor T1 has a gate terminal to which the input voltage VIN is supplied. The transistor T1 has a drain terminal connected to a line L4 of the current mirror unit MRN. The transistor T1 supplies a current $I_1$ corresponding to the input voltage VIN supplied to the gate terminal to the line L4.

The transistor T2 has a gate terminal connected to the output line LO, and a drain terminal connected to a line L2 of the current mirror unit MRN. The transistor T2 supplies a current $I_2$ corresponding to the voltage of the output line LO to the line L2.

A current value obtained by adding the current $I_1$ to the current $I_2$ is equal to the above-described constant current $I_0$.

The current source CG2 has one end to which a ground line LG is connected, and the other end connected to respective source terminals of the transistors T3 and T4. The current source CG2 generates a predetermined constant current $I_c$, and supplies it to the ground line LG. A ground voltage VSS is applied to the ground line LG.

The transistor T3 has a gate terminal to which the input voltage VIN is supplied, and a drain terminal connected to a line L3 of the current mirror unit MRN. The transistor T3 extracts a current $I_a$ correspond to the input voltage VIN from the line L3, and flows it to the current source CG2.

The transistor T4 has a gate terminal connected to the output line LO, and a drain terminal connected to a line L1 of the current mirror unit MRN. The transistor T4 extracts a current $I_b$ corresponding to the voltage of the output line LO from the line L1, and flows it to the current source CG2.

A current value obtained by adding the current $I_a$ to the current $I_b$ is equal to the above-described constant current $I_c$.

The current mirror unit MRN includes P-channel MOS type transistors T5 to T8, and T23, N-channel MOS type transistors T9 to T12, and a capacitor CN.

The transistors T5 and T6 have source terminals each connected to the power supply line LV. The transistor T5 and T6 have respective gate terminals connected to one another. The gate terminal and a drain terminal of the transistor T5 are connected to the line L1 as a first reference current line. The transistor T6 has a drain terminal connected to the line L3 as a first output current line.

The above-described transistors T5 and T6 form a current mirror circuit in a high voltage side. Accordingly, a current with an amount of current same as that of the current flowing between the source and the drain of the transistor T5 flows between the source and the drain of the transistor T6.

The transistors T7 and T8 have respective gate terminals to which a bias voltage BS4 generated by a bias generating unit (not illustrated) is supplied. The transistor T7 has a source terminal connected to the line L1, and a drain terminal connected to the line L2 as a second reference current line. The transistor T8 has a source terminal connected to the line L3, and a drain terminal connected to the positive drive line LH. The positive drive voltage PG is output via the positive drive line LH.

The transistor T9 has a drain terminal connected to the line L1, and a source terminal connected to the line L2. The transistors T9 and T10 have respective gate terminals to which a bias voltage BS5 generated by the above-described bias generating unit is supplied. The transistor T10 has a source terminal connected to a line L4 as a second output current line, and a drain terminal connected to the positive drive line LH.

The transistor T11 has a drain terminal and a gate terminal both connected to the line L2, and a source terminal connected to the ground line LG. The transistors T11 and T12 have respective gate terminals connected to one another. The transistor T12 has a drain terminal connected to the line L4, and a source terminal connected to the ground line LG.

The above-described transistors T11 and T12 form a current mirror circuit in a low voltage side. Accordingly, a current with an amount of current same as that of the current flowing between the drain and the source of the transistor T11 flows between the drain and the source of the transistor T12.

The transistor T23 has a source terminal connected to the positive drive line LH, and a drain terminal connected to the negative drive line LL. The negative drive voltage NG is output via the negative drive line LL. The transistor T23 has a gate terminal to which a bias voltage BS6 generated by the above-described bias generating unit is supplied.

The capacitor CN is disposed between the positive drive line LH and the line L3. That is, the capacitor CN has one end connected to the positive drive line LH, and the capacitor CN has the other end connected to the line L3.

With the above-described configuration, the positive drive voltage PG corresponding to the difference between the input voltage VIN and the voltage VOUT of the output line LO is generated on the positive drive line LH, and the positive drive voltage PG is supplied to the output unit 2 via the positive drive line LH. The negative drive voltage NG corresponding to the difference between the input voltage VIN and the voltage VOUT of the output line LO is generated on the negative drive line LL, and the negative drive voltage NG is supplied to the output unit 2 via the negative drive line LL.

Figure 12:
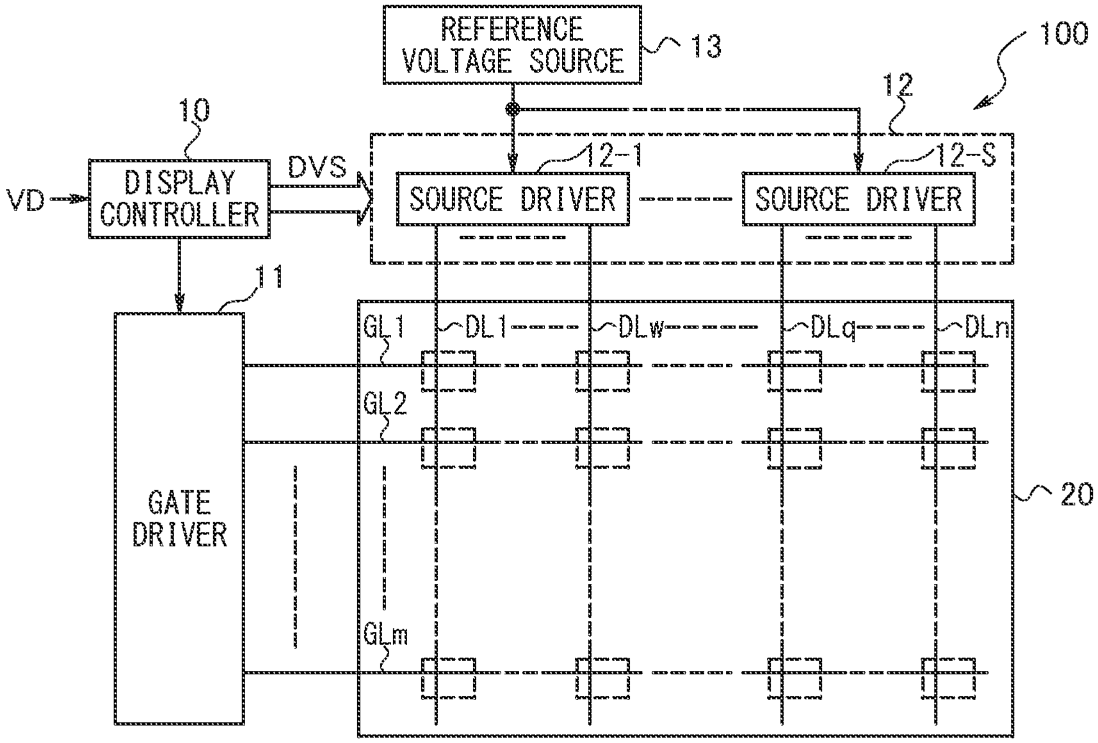
FIG. 12 is a block diagram illustrating a schematic configuration of a display apparatus including a source driver that employs the output amplifiers of FIG. 1 and FIG. 9.

Next, FIG. 12 illustrates a schematic configuration of a display apparatus including a source driver that employs the output amplifiers AMP of Embodiments 1 and 2 described above.

As illustrated in FIG. 12, a display apparatus 100 includes a display controller 10, a gate driver 11, a source driver 12, a reference voltage source 13, and a display panel 20.

The display panel 20 is configured of, for example, a liquid crystal display panel or an OELD panel, and includes m (m is a natural number of 2 or more) gate lines GL1 to GLm extending in the horizontal direction of a two-dimensional screen, and n (n is an even number of 2 or more) source lines DL1 to DLn extending in the vertical direction of the two-dimensional screen. Display cells (regions surrounded by dashed line) indicating red, green, or blue are formed at respective intersecting portions of the gate lines GL1 to GLm and the source lines DL1 to DLn.

The display controller 10 receives a video signal VD, and supplies a gate timing signal, which indicates a timing of applying a gate selection signal to each of the gate lines GL1 to GLm, based on the video signal VD to the gate driver 11.

The display controller 10 generates various kinds of control signals including a clock signal, a polarity inversion signal, a synchronization signal, and the like, and a series of display data PD indicating luminance levels of respective pixels as digital values based on the video signal VD. The display controller 10 supplies a digital video signal DVS including the control signals and the series of display data PD to the source driver 12.

The gate driver 11 sequentially generates gate selection signals including at least one pulse for selecting the gate line in accordance with the gate timing signal supplied from the display controller 10, and supplies the gate selection signals to the respective gate lines GL1 to GLm of the display panel 20.

The source driver 12 retrieves the series of display data PD included in the video signal DVS for each horizontal scanning line (n pieces), and converts each of the display data PD into a pixel drive signal having an analog voltage value corresponding to the luminance level. Then, the source driver 12 supplies the generated n pixel drive signals to the respective source lines DL1 to DLn of the display panel 20.

While the source driver 12 includes S (S is an integer of 2 or more) source drivers 12-1 to 12-S included in respective S semiconductor IC chips that are each independent, the source driver 12 may be configured of one source driver.

The source drivers 12-1 to 12-S are provided corresponding to respective source line groups into which the source lines DL1 to DLn of the display panel 20 are divided, and the source line group includes mutually adjacent w (w is an integer of 2 or more) source lines. The source drivers 12-1 to 12-S have the mutually same internal configurations. For example, the source driver 12-1 supplies the pixel drive signals corresponding to the respective source lines DL1 to DLw to the respective w source lines DL1 to DLw in the source lines DL1 to DLn. The source driver 12-S supplies the pixel drive signals corresponding to the respective source lines DLq (q is an integer of 2 or more) to DLn to the respective w source lines DLq to DLn in the source lines DL1 to DLn.

The reference voltage source 13 generates two reference voltages VGH, VGL. A magnitude relationship of the voltage level between VGH and VGL is VGH>VGL. The reference voltage source 13 is connected to each of the source drivers 12-1 to 12-*s*, and supplies the reference voltages VGH, VGL to each of the source drivers 12-1 to 12-S.

Figure 13:
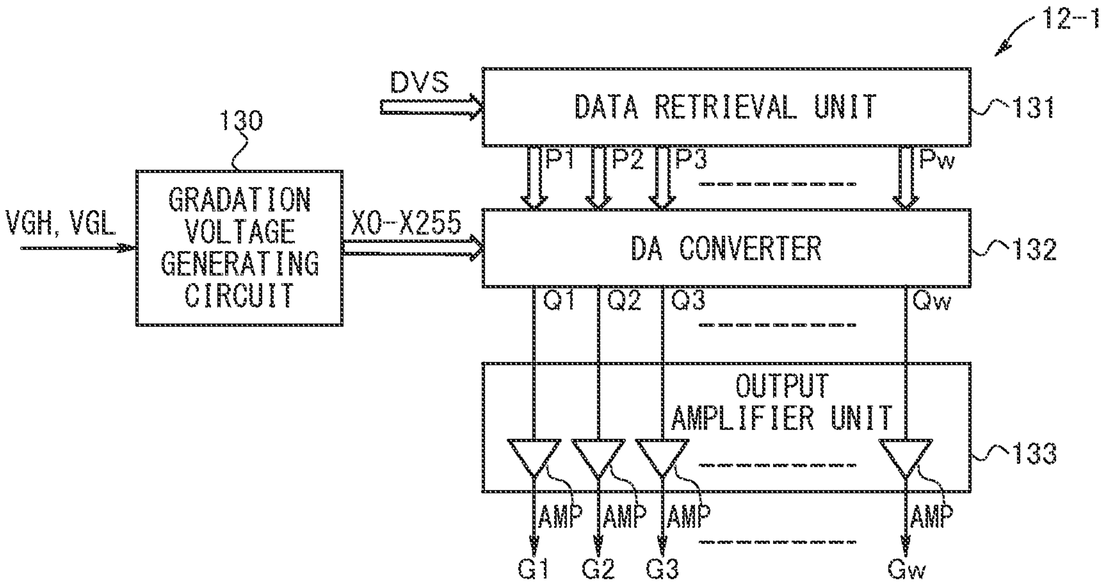
FIG. 13 is a block diagram illustrating an internal configuration of the source driver of FIG. 12.

FIG. 13 is a block diagram illustrating schematically illustrating a configuration inside the source driver 12-1 extracted from the source drivers 12-1 to 12-S. The configurations of the source drivers 12-2 to 12-S are the same as the configuration of the source driver 12-1.

As illustrated in FIG. 13, the source driver 12-1 includes a gradation voltage generating circuit 130, a data retrieval unit 131, a DA converter 132, and an output amplifier unit 133.

The gradation voltage generating circuit 130 is connected to the reference voltage source 13. The gradation voltage generating circuit 130 generates gradation voltages X0 to X255 based on the reference voltages VGH, VGL output from the reference voltage source 13, and supplies them to the DA converter 132. The gradation voltages X0 to X255 indicate a range of the luminance level that can be expressed by the video signal in, for example, 256 levels, and have mutually different voltage values.

The data retrieval unit 131 sequentially retrieves the w display data PD corresponding to the source lines DL1 to DLw from the series of the display data PD included in the video signal DVS for each horizontal scanning period, and supplies the retrieved display data PD to the DA converter 132 as display data P1 to Pw.

The DA converter 132 uses the gradation voltages X0 to X255 to convert the display data P1 to Pw into gradation voltage signals Q1 to Qw having analog voltage values. That is, the DA converter 132 selects the gradation voltage having the voltage value corresponding to the luminance level indicated by the display data P from the gradation voltages X0 to X255 for each of the display data P1 to Pw. Then, the DA converter 132 obtains the gradation voltage signals Q1 to Qw each having the gradation voltage selected for each of the display data P1 to Pw. The DA converter 132 supplies the gradation voltage signals Q1 to Qw to the output amplifier unit 133.

The output amplifier unit 133 outputs signals obtained by individually amplifying each of the gradation voltage signals Q1 to Qw as pixel drive signals G1 to Gw. That is, the output amplifier unit 133 of the source driver 12-1 outputs the pixel drive signals G1 to Gw to supply them to the source lines DL1 to DLw of the display panel 20, respectively. For each output amplifier of the output amplifier unit 133, the above-described output amplifier AMP of Embodiment 1 or 2 is used. The gradation voltage signals Q1 to Qw are input as the input voltages VIN of the respective output amplifiers AMP, and the pixel drive signals G1 to Gw are generated as the output voltages VOUT of the respective output amplifiers AMP.

The output amplifier of the disclosure is not limited to the use as an output amplifier of a source driver to drive a display panel, and can be used as an impedance converter and a buffer in various circuits.

What is claimed is:

1. An output amplifier that amplifies an input voltage to generate an output voltage and outputs the output voltage from an output terminal, the output amplifier comprising:

a drive voltage generating unit that generates a positive drive voltage and a negative drive voltage corresponding to a difference between the input voltage and the output voltage;

an output unit including a first transistor for flowing out of a current and a second transistor for flowing in of the current forming a complementary output between a first positive power supply terminal and a first negative power supply terminal, the first transistor flowing out the current from the first positive power supply terminal to the output terminal in accordance with the positive drive voltage, the second transistor flowing the current from the output terminal into the first negative power supply terminal in accordance with the negative drive voltage;

a positive clamp voltage generating circuit that applies a positive clamp voltage corresponding to the input voltage to the first positive power supply terminal; and a negative clamp voltage generating circuit that applies a negative clamp voltage corresponding to the input voltage to the first negative power supply terminal.

2. The output amplifier according to claim 1, wherein the positive clamp voltage generating circuit generates a voltage higher than a target voltage of the input voltage by a predetermined voltage as the positive clamp voltage at a rising of the input voltage, and the negative clamp voltage generating circuit generates a voltage lower than a target voltage of the input voltage by the predetermined voltage as the negative clamp voltage at a falling of the input voltage.

3. The output amplifier according to claim 1, wherein the positive clamp voltage generating circuit selects one positive voltage corresponding to the input voltage from a plurality of positive voltages having mutually different voltage levels, and generates the one positive voltage as the positive clamp voltage, and the negative clamp voltage generating circuit selects one negative voltage corresponding to the input voltage from a plurality of negative voltages having mutually different voltage levels, and generates the one negative voltage as the negative clamp voltage.

4. The output amplifier according to claim 1, wherein the positive clamp voltage generating circuit includes a positive source follower circuit including a P-channel transistor having a gate that receives the input voltage, and an N-channel transistor having a gate that receives an output voltage of the positive source follower circuit and generating the positive clamp voltage based on a power supply voltage, and the negative clamp voltage generating circuit includes a negative source follower circuit including an N-channel transistor having a gate that receives the input voltage and a P-channel transistor having a gate that receives an output voltage of the negative source follower circuit and generating the negative clamp voltage based on a ground potential.

5. The output amplifier according to claim 1, wherein the output unit includes an auxiliary output unit including a third transistor for flowing out of a current and a fourth transistor for flowing in of the current forming a complementary output, the third transistor flows out the current to the output terminal in accordance with the positive drive voltage during a predetermined period from a start of rising of the input voltage, and the fourth transistor flows the current in from the output terminal in accordance with the negative drive voltage during the predetermined period from a start of falling of the input voltage.

6. The output amplifier according to claim 5, wherein the third transistor and the fourth transistor form the complementary output between a second positive power supply terminal to which a power supply voltage is applied and a second negative power supply terminal to which a ground potential is applied.

7. A source driver comprising:

a gradation voltage signal generating unit that generates gradation voltage signals for a plurality of data lines of a display panel corresponding to a video signal; and a plurality of output amplifiers that amplify the gradation voltage signals to obtain respective drive signals and output the drive signals to the plurality of data lines of the display panel, wherein each of the plurality of output amplifiers includes:

a drive voltage generating unit that generates a positive drive voltage and a negative drive voltage corresponding to a difference between a voltage of a corresponding gradation voltage signal of the gradation voltage signals and a voltage of a corresponding drive signal of the drive signals;

an output unit including a first transistor for flowing out of a current and a second transistor for flowing in of the current forming a complementary output between a positive power supply terminal and a negative power supply terminal, the first transistor flowing out the current from the positive power supply terminal to a corresponding data line of the plurality of data lines in accordance with the positive drive voltage, the second transistor flowing the current from the corresponding data line to the negative power supply terminal in accordance with the negative drive voltage;

a positive clamp voltage generating circuit that applies a positive clamp voltage corresponding to the voltage of the corresponding gradation voltage signal to the positive power supply terminal; and a negative clamp voltage generating circuit that applies a negative clamp voltage corresponding to the voltage of the corresponding gradation voltage signal to the negative power supply terminal.

8. A display apparatus comprising:

a display panel including a plurality of data lines and a plurality of gate lines, and display cells provided at respective intersecting portions of the plurality of data lines and the plurality of gate lines in a matrix;

a gate driver that is connected to the plurality of gate lines, selects a gate line of the plurality of gate lines in a predetermined order, and supplies gate signals to the selected gate line;

a source driver including a gradation voltage signal generating unit and a plurality of output amplifiers, the gradation voltage signal generating unit generating gradation voltage signals for the plurality of data lines corresponding to a video signal, the plurality of output amplifiers amplifying the gradation voltage signals to obtain respective drive signals and outputting the drive signals to the plurality of data lines of the display panel; and a display controller that controls respective operations of the gate driver and the source driver based on the video signal, wherein each of the plurality of output amplifiers includes:

a drive voltage generating unit that generates a positive drive voltage and a negative drive voltage corresponding to a difference between a voltage of a corresponding gradation voltage signal of the gradation voltage signals and a voltage of a corresponding drive signal of the drive signals;

an output unit including a first transistor for flowing out of a current and a second transistor for flowing in of the current forming a complementary output between a positive power supply terminal and a negative power supply terminal, the first transistor flowing out the current from the positive power supply terminal to a corresponding data line of the plurality of data lines in accordance with the positive drive voltage, the second transistor flowing the current from the corresponding data line to the negative power supply terminal in accordance with the negative drive voltage;

a positive clamp voltage generating circuit that applies a positive clamp voltage corresponding to the voltage of the corresponding gradation voltage signal to the positive power supply terminal; and a negative clamp voltage generating circuit that applies a negative clamp voltage corresponding to the voltage of the corresponding gradation voltage signal to the negative power supply terminal.

* * * * *